United States Patent Office 2,770,657
Patented Nov. 13, 1956

2,770,657

NITROGEN DIOXIDE COMPOUNDS OF 1,3-DICHLORO-2-BUTENE, AND COMPOSITIONS CONTAINING THE SAME

Jack Raymond Hively, Clarksville, Ind., assignor to E. I. du Pont de Nemours and Company, Wilmington, Del., a corporation of Delaware No Drawing. Application February 11, 1953, Serial No. 336,441

6 Claims. (Cl. 260—644)

This invention relates to nitrogen dioxide compounds of 1,3-dichloro-2-butene and compositions containing the same. The invention relates more particularly to the manufacture of nitrogen dioxide compounds which are particularly useful in prohibiting the formation of granular polymers during the distillation or storage of 2-chloro-1,3-butadiene and related chlorobutadiene compounds. These polymers are generally referred to in the art as "cauliflower" or "popcorn" polymers.

In the manufacture of 2-chloro-1,3-butadiene (chloroprene), difficulty is encountered during the distillation and storage of this product due to the formation of "cauliflower" or "popcorn" polymers. These granular polymers are formed by the spontaneous polymerization of the monomers in the system and so-called "seeds" result. These "seeds" then act as sites for further polymerization and the monomers present continue to polymerize at these points, causing a build-up of the "popcorn" polymer.

The "seeds" attach themselves to the equipment, and since their growth is exponential the plant equipment becomes fouled in a very short time. The problem is further complicated by the fact that the "popcorn" polymer is insoluble in all solvents and cannot be entirely removed from the equipment by solvents or by mechanical means. Even when the equipment is cleaned as thoroughly as possible residual particles remain and promote polymer growth during the next cycle. Thus, the equipment is very quickly fouled again. In addition, this uncontrolled polymerization causes loss of valuable raw material and in clogging pipes, condensers and storage tanks, thereby greatly increasing the overall costs of production.

While gaseous nitrogen dioxide has been used to prevent the growth of the small granular polymer "seeds" in butadiene refining systems and has been found to stabilize chloroprene against this "popcorn" polymer growth, it produces unstable explosive products which present a serious hazard. Other compounds such as disclosed in U. S. Patent 2,483,778 have been described for preventing this granular polymer formation in butadiene systems, but they have been found to have little or no value in preventing the growth of these undesirable polymers in the chloro-1,3-butadiene processes.

It is therefore an object of the present invention to produce a stable nitrogen dioxide reaction product of 1,3-dichloro-2-butene which is effective in preventing granular polymer formation in the manufacture of 2-chloro-1,3-butadiene and related chlorobutadienes such as 2,3-dichloro-1,3-butadiene. A further object is to provide a process for retarding the granular polymer formation in the manufacture and storage of 2-chloro-1,3-butadiene.

I have found that a stable nitrogen-containing 1,3-dichloro-2-butene composition can be obtained which is effective in prohibiting undesirable granular polymer formation in the manufacture of 2-chloro-1,3-butadiene and related compounds, by reacting 1,3-dichloro-2-butene with nitrogen dioxide gas or liquid until the resulting product contains from approximately 0.003 to 0.74 part of nitrogen dioxide per part of 1,3-dichloro-2-butene (i. e., until the $NO_2$ content of the product ranges from 0.3% to 42.5%). The reaction may be carried out at temperatures of from $-30°$ to $+125°$ C., although the reaction is preferably carried out at temperatures of from $-10°$ to $+10°$ C. in the initial state, with completion of the reaction at somewhat higher temperatures, preferably at around 30° to 40° C. While the higher temperatures even up to 125° C. are operable, even during the initial stages of the reaction, it has been found that by the use of the preferred temperatures a product is obtained which is somewhat more active in preventing the granular polymer growth in the chlorine containing butadienes.

The extent of the reaction can be followed by nitrogen analysis or by the increase in specific gravity of the mass which can be calibrated in terms of the nitrogen dioxide content of the reaction mixture. It has been found that the specific gravity increases 0.002 gravity points per 1% increase in $NO_2$ content. The 1,3-dichloro-2-butene–nitrogen dioxide reaction compound should be stored in the cold, that is, at temperatures of about 0° C. or below, until it is used, to prevent the formation of tarry materials of unknown composition, and reduction in the effectiveness of the material as a "popcorn" polymer inhibitor.

Since the reaction is exothermic, the rate of addition of the nitrogen dioxide to the 1,3-dichloro-2-butene is adjusted so as to maintain the temperature in the early stages of the reaction at the preferred temperatures.

The 1,3-dichloro-2-butene–nitrogen dioxide reaction product is a blue colored solution and may be used without purification in processes for the manufacture of 2-chloro-1,3-butadiene and 2,3-dichloro-1,3-butadiene or related products.

The exact chemical constitution of the reaction product of the 1,3-dichloro-2-butene and the nitrogen dioxide has not been ascertained. The reaction is decidedly exothermic, and, since the resulting product is a homogeneous liquid, the reactive constituent is considered as containing at least one $NO_2$ per mol of 1,3-dichloro-2-butene. When the full .74 part of $NO_2$ is added, the product would appear to contain two $NO_2$ radicals per mol of the dichlorobutene. The manner in which the nitrogen and oxygen are attached to the dichlorobutene, however, has not been proved. When less nitrogen dioxide is added to the dichlorobutene than that required to produce a mono addition product, the remaining unreacted 1,3-dichloro-2-butene acts merely as a diluent.

Very small amounts of the 1,3-dichloro-2-butene–nitrogen dioxide reaction product are required to inhibit the formation of polymer growth in the butadienes. It is therefore preferable to use this reaction product as a dilute solution in the excess 1,3-dichloro-2-butene or in other solvents such as toluene, benzene or toluene substitutes such as petroleum fractions which have a boiling range of from 60° to 150° C., either alone or mixed with the excess dichlorobutene. Solutions containing the dichlorobutene–nitrogen dioxide reaction product in amounts so as to give from 0.1% to 10% of $NO_2$ in the diluted solution are suitable for addition to the chlorobutadienes which are to be stabilized against undesirable polymer formation.

To protect the chlorobutadiene refining equipment from granular polymer growth, this inhibitor may be added either to the refining column feed by a continuous or periodic injection or it can be sprayed into the top of the column before or during operation. The equipment life can be more than tripled by use of this invention, resulting in reduced operational costs and lower maintenance.

The following examples are given to more fully illustrate the invention, in which the parts used are by weight unless otherwise specified.

*Example 1*

Gaseous or liquid nitrogen dioxide is added to 1,3-dichloro-2-butene cooled to from —5° to —10° C. under agitation and with refrigeration, at such a rate that the reaction mass remains at from —5° to —10° C. The nitrogen dioxide addition is continued until 0.11 part of $NO_2$ per part of the dichlorobutene is reacted and the composition contains approximately 10% nitrogen dioxide by weight. The solution is agitated for two hours, and at the end of this period the very small amount of residual nitrogen dioxide is reacted by heating the mixture to 40° C. The mass is then cooled to 0° C. and stored at this temperature until used.

The 1,3-dichloro-2-butene may be reacted with nitrogen dioxide by a continuous process in which the nitrogen dioxide and the 1,3-dichloro-2-butene are metered into a reaction vessel at such a rate as to form the product of desired $NO_2$ content. This may be carried out in a reaction column or in a set of reactors in which a heat exchanger and refrigeration equipment are employed to maintain the desired temperatures. After the initial reaction, it is desirable to let the reaction product heat up to from 30° to 40° C. for from 5 to 15 minutes so as to combine any dissolved $NO_2$ that may be present in the solution. This may conveniently be done in a second reactor into which the cold reaction product is allowed to flow. Both during the reaction and aging the solutions are preferably agitated and maintained at relatively constant temperatures so that a uniform product is obtained. After aging, the product is preferably stored at temperatures of 0° C. or below, in the same manner as when produced by the batch process.

*Example 2*

Into a pressure vessel, a 0.1 gram seed of granular polymer was placed and 100 grams of 2-chloro-1,3-butadiene monomer were added, together with 0.15% of the inhibitor of Example 1 (containing 10% of combined nitrogen dioxide). The system was swept free of air with nitrogen, and, after sealing, was held at from 75° to 80° C. for 300 hours, during which time no apparent growth of the seed of granular polymer was observed. When the identical procedure was carried out without the addition of the dichlorobutene–$NO_2$ reaction product, polymer growth filled the pressure vessel in 5 hours.

*Example 3*

A 0.1 gram seed of 2,3-dichloro-1,3-butadiene granular polymer was placed in a pressure vessel; 50 grams of 2,3-dichloro-1,3-butadiene monomer and 0.05% of the inhibitor of Example 1 were added to the monomer. The system was swept with nitrogen and the pressure vessel was sealed and stored at 25° C. No polymer growth occurred in 600 hours. Where the same procedure was followed in the absence of the "popcorn" inhibitor, polymer growth filled the vessel within 5 hours.

As stated above, the amount of inhibitor employed may be varied widely. It has been found in tests carried out as in the above examples, that, to effectively inhibit the granular polymer growth in 2-chloro-1,3-butadiene or in 2,3-dichloro-1,3-butadiene, the amount of the 1,3-dichloro-2-butene–nitrogen dioxide reaction product may be such as to give only .001% by weight of combined $NO_2$ based on the chlorobutadiene to be stabilized. Amounts which would give as much as 1.0% of combined $NO_2$ can also be satisfactorily employed even where the stabilizing solution contains only 0.3% of $NO_2$. In other words, the amount of unreacted 1,3-dichloro-2-butene or other hydrocarbon solvent present in such dilute solution does not adversely affect the properties of the polymers which are subsequently produced from the chloroprene or the 2,3-dichloro-1,3-butadiene. As pointed out above, where it is desired to keep the amount of 1,3-dichloro-2-butene to a minimum, other solvents may be employed.

I claim:

1. A process for preparing a stable nitrogen-containing derivative of 1,3-dichloro-2-butene which comprises reacting 0.003 to 0.74 part of nitrogen dioxide with 1 part of 1,3-dichloro-2-butene at temperatures of from —30° to +125° C.

2. The 1,3-dichloro-2-butene-nitrogen dioxide reaction product obtained by the process of claim 1.

3. A process for preparing a stable nitrogen-containing derivative of 1,3-dichloro-2-butene which comprises reacting 0.003 to 0.74 part of nitrogen dioxide with 1 part of 1,3-dichloro-2-butene at temperatures of from —10° C. to +10° C. until the reaction is substantially completed, then heating the resulting product to temperatures of from 30° to 40° C. to insure complete reaction of all the $NO_2$.

4. A chloro-1,3-butadiene compound of the group consisting of 2-chloro-1,3-butadiene and 2,3-dichloro-1,3-butadiene stabilized against the growth of granular polymers by containing a 1,3-dichloro-2-butene–nitrogen dioxide reaction product obtained by the process of claim 1 in an amount sufficient to give in the chloro-1,3-butadiene solution from 0.001% to 1.0% of combined $NO_2$.

5. 2-Chloro-1,3-butadiene stabilized against the growth of granular polymers, by containing a 1,3-dichloro-2-butene–nitrogen dioxide reaction product obtained by the process of claim 1 in an amount sufficient to give in the 2-chloro-1,3-butadiene solution from 0.001% to 1.0% of combined $NO_2$ 6. 2,3-Dichloro-1,3-butadiene stabilized against the growth of granular polymers, by containing a 1,3-dichloro-2-butene–nitrogen dioxide reaction product obtained by the process of claim 1 in an amount sufficient to give in the 2,3-dichloro-1,3-butadiene solution from 0.001% to 1.0% of $NO_2$ in combined form.

References Cited in the file of this patent

UNITED STATES PATENTS

| Re. 23,399 | Kooijman | Aug. 14, 1951 |
|---|---|---|
| 2,473,341 | Koojiman et al. | June 14, 1949 |
| 2,478,243 | Coe et al. | Aug. 9, 1949 |

FOREIGN PATENTS

| 637,252 | Great Britain | May 17, 1950 |